Jan. 5, 1965     G. W. WRIGHT ETAL     3,164,322
LARGE NUMERAL REGISTERING MECHANISM
Filed April 29, 1963     7 Sheets-Sheet 1
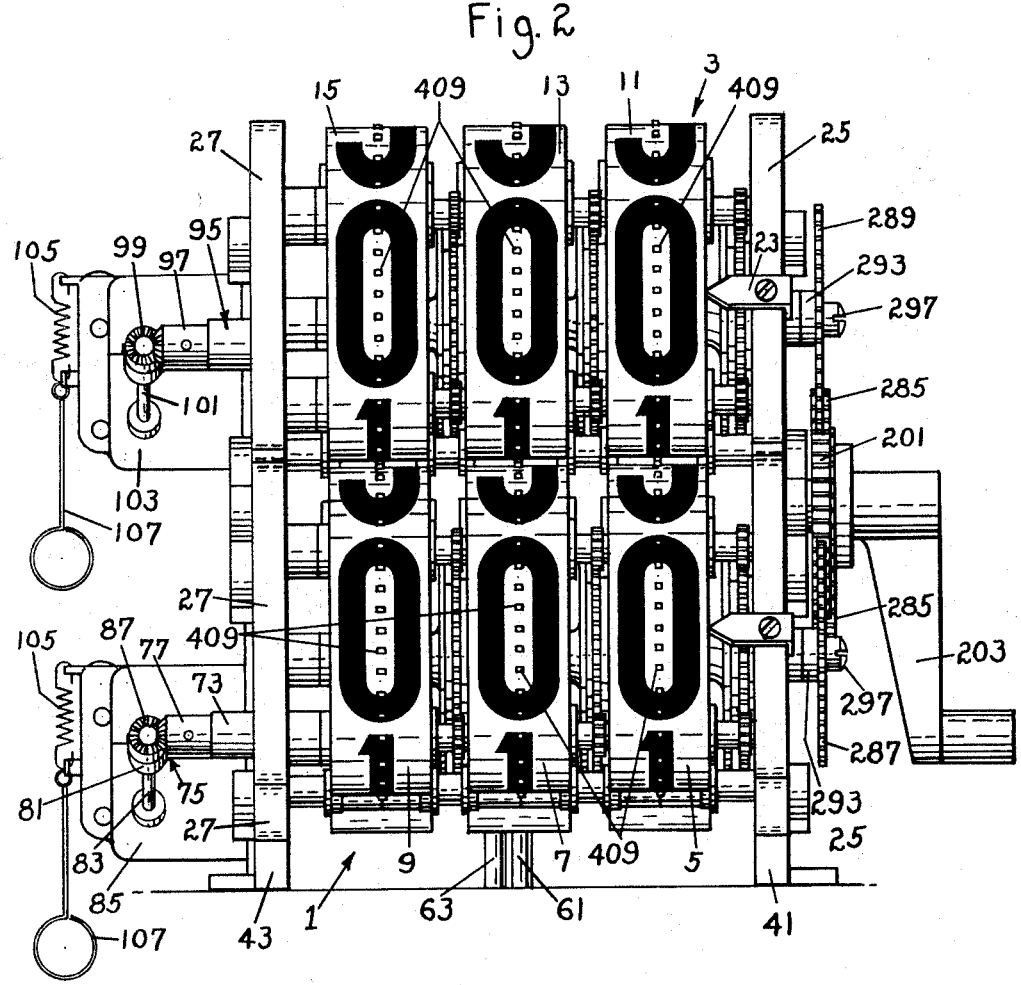
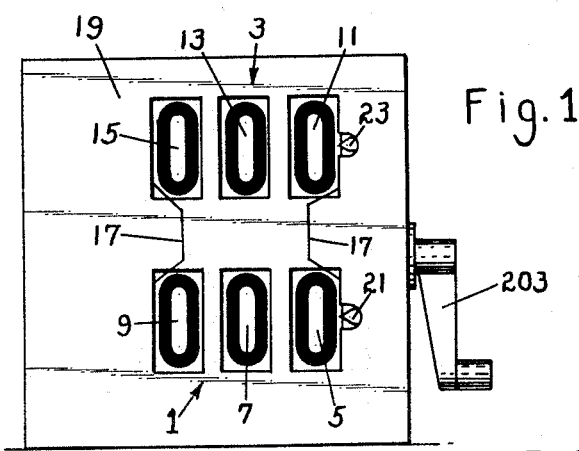
INVENTORS
GEORGE W. WRIGHT,
ROBERT J. JAUCH,
CHRISTIAN W. KRUCKEBERG,
JOSEPH D. CLYMER
BY: *Edmund W. Kamm*
ATTORNEY

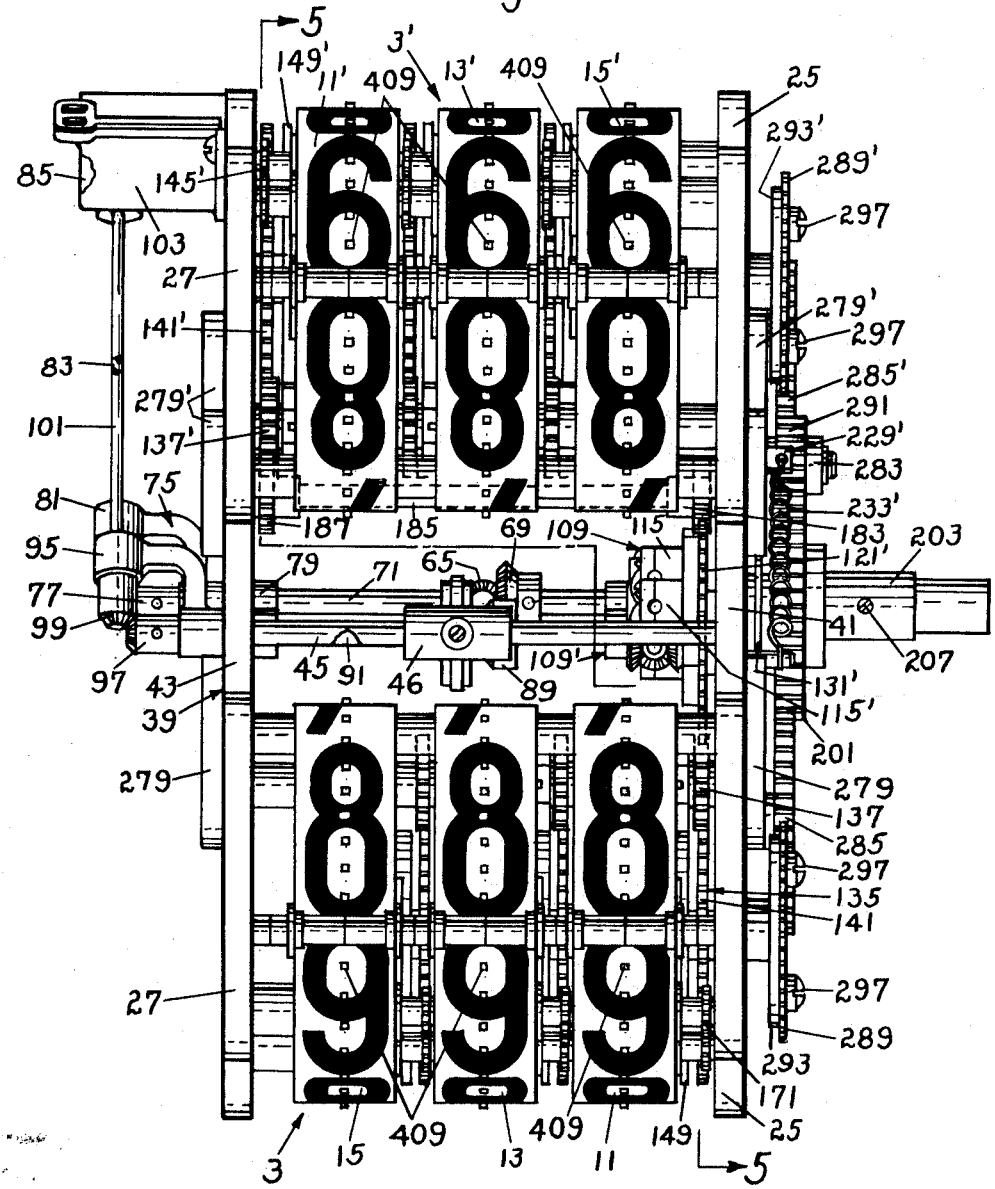

INVENTORS
GEORGE W. WRIGHT,
ROBERT J. JAUCH,
CHRISTIAN W. KRUCKEBERG,
JOSEPH D. CLYMER

BY: Edmund W. E. Kamm
ATTORNEY

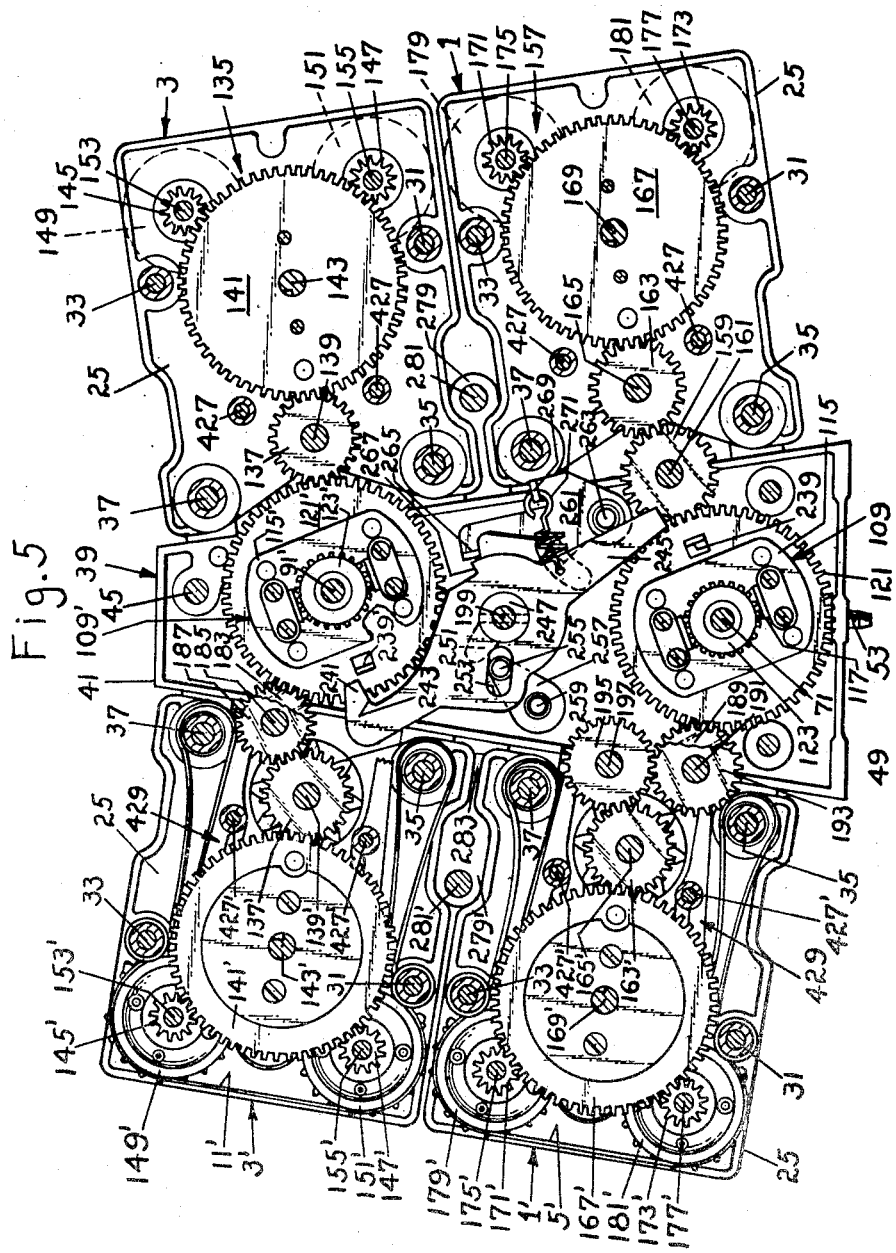

Jan. 5, 1965
G. W. WRIGHT ETAL
3,164,322
LARGE NUMERAL REGISTERING MECHANISM
Filed April 29, 1963
7 Sheets-Sheet 5
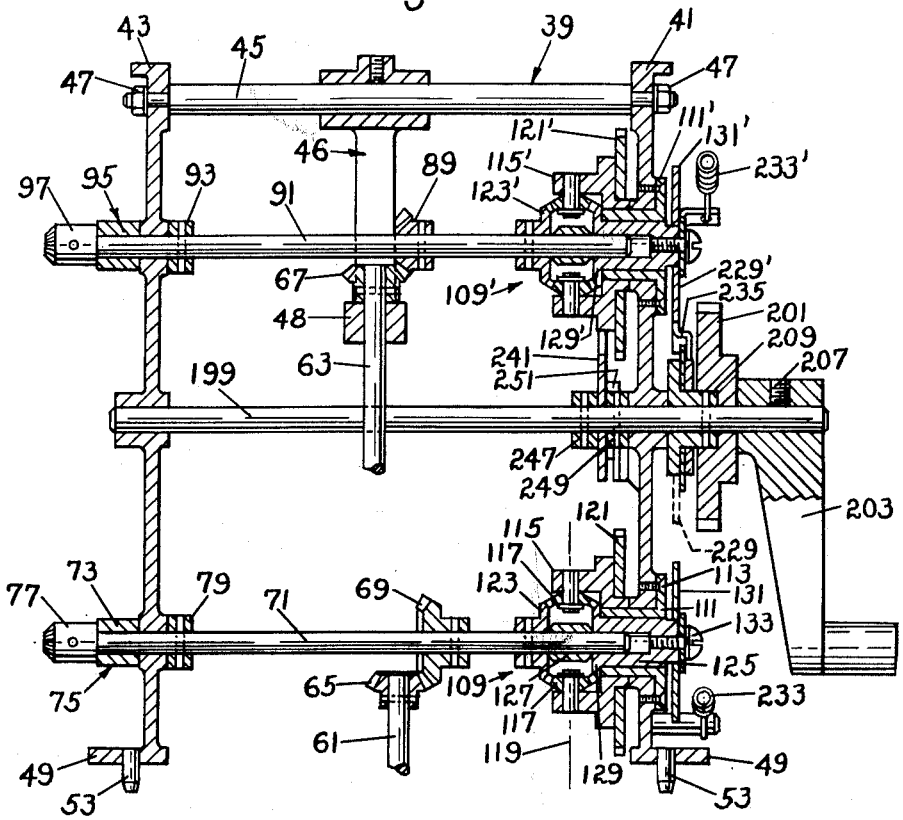
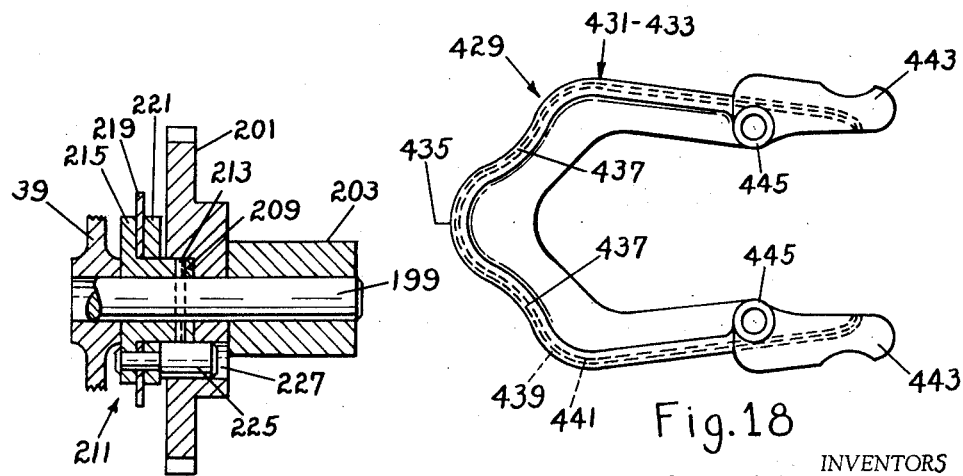
INVENTORS
GEORGE W. WRIGHT,
ROBERT J. JAUCH,
CHRISTIAN W. KRUCKEBERG,
JOSEPH D. CLYMER
BY: Edmund W. E. Kamm
ATTORNEY

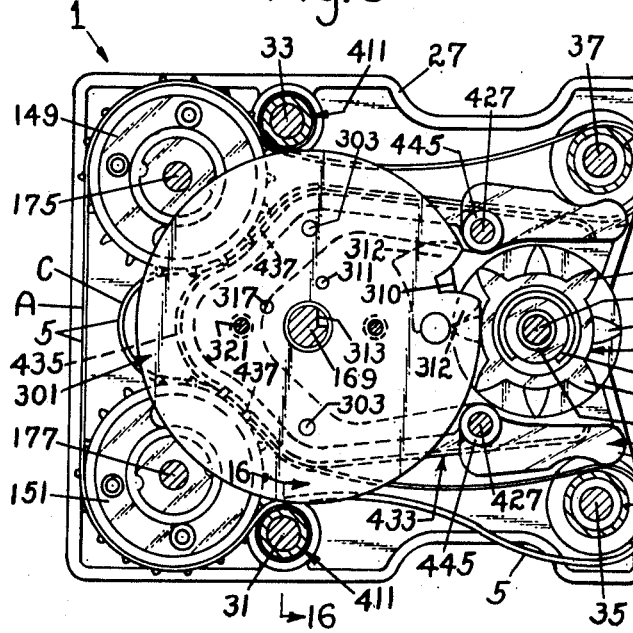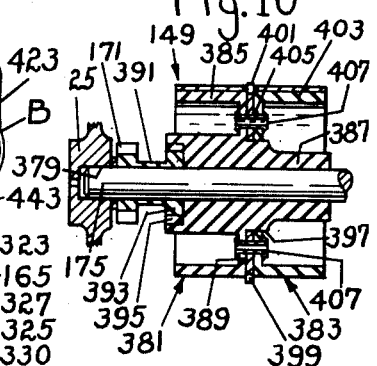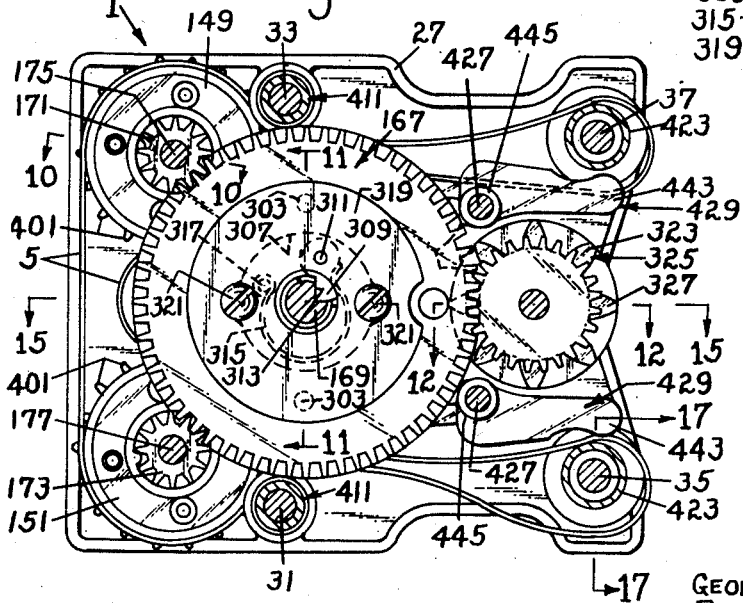

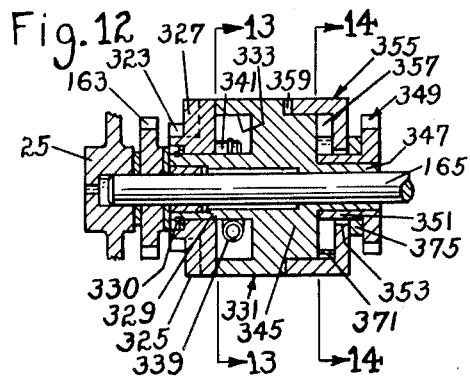

United States Patent Office 3,164,322
Patented Jan. 5, 1965

3,164,322
LARGE NUMERAL REGISTERING
MECHANISM
George W. Wright, Yoder, and Robert J. Jauch, Christian W. Kruckeberg, and Joseph D. Clymer, Fort Wayne, Ind., assignors to Tokheim Corporation, Fort Wayne, Ind., a corporation of Indiana
Filed Apr. 29, 1963, Ser. No. 276,410
27 Claims. (Cl. 235—125)

This invention relates to a counter or other register which displays information in large numerals or indicia. Many attemps have been made in the past to increase the readability of the indicia displayed on the indicators by increasing the size of the indicia and the weight of the lines which form the indicia.

Numerous problems are presented which must be overcome to provide a commercially acceptable register of this type. One such problem is that of minimizing the overall cubic size of the register. Obviously, if in a decimal counter, two inch high numerals are to be provided which are spaced one-quarter inch apart, the length of the surface which has to be moved past the viewing point is ten time 2.25 inches or 22.5 inches.

If the indicator is designed as a wheel or drum, the diameter of the drum must be $D = C/\pi$ or $22.5/3.1416$ which is over seven inches. Obviously the cubage of a register utilizing such drums will be large. Further, the peripheral velocity of such drums will also be large. If we consider that the drum is driven by a liquid meter which is delivering only fifteen gallons a minute, the tenth gallon wheel, which will rotate one revolution for each gallon will, at its periphery be moving $15 \times 22.5''$ or 337.5 inches/minute. Assuming further that the unit price of the liquid being delivered is 30¢/gallon the one cent wheel of the cost register will make three revolutions per gallon or 45 r.p.m. at 15 g.p.m. and will have a peripheral speed of $45 \times 22.5''$ or 1012.5 inches per minute.

A transfer mechanism is required to move the adjacent higher order wheel (such as the 10¢ wheel) one tenth of a revolution for each revolution of the lower order wheel (1¢ wheel) in a decimal system. This transfer must occur during the time that the numeral 9 of the lower order wheel passes from view and the zero appears fully in the display area. Such transfer mechanisms usually comprise a two tooth gear sector and a locking plate on the lowest order wheel. The teeth of the sector mesh with a transfer pinion which rotates on a shaft mounted beyond the periphery of the numeral wheels. This meshing occurs only during the passage of the 9 and the appearance of the zero as noted above and the locking plate locks the pinion except during the transfer action. Accordingly, the high peripheral speed of the sector, which is substantially the same as that of the surface of the indicator wheel, results in high impact pressures and shock when it strikes and meshes with the transfer pinion.

This impact is rendered more serious by the fact that the stationary second order wheel, which has to be wider and larger in diameter because of the large numerals and therefore is more massive than a smaller wheel, presents a large inertia load which must be accelerated quickly by the transfer mechanism. The result is that the transfer mechanisms break down and, while numerous attempts have been made to design reliable high-speed transfer mechanisms, these difficulties have not been overcome by practical mechanisms.

To avoid the cubage required by drum type, large numeral registers, some attempts have been made to use numeral bearing tapes or belts instead of wheels. However, such units present their own peculiar problems, and it is an object of the invention to overcome such problems so as to provide a commercially acceptable tape register having large numerals, which can operate at high speeds and which will occupy a relatively small space.

It is a further object of the invention to provide a belt type register which will have high reliability and long life.

Another object is to provide a register mechanism of the type described which is in modular form so that portions of the input drives, resetting drive, and other apparatus are built in the base unit while one or more self-contained registering belt units, which have the remaining portions of the drives, are removably mounted on the base unit so as to connect the drives.

It is a further object of the invention to make the registering units interchangeable so far as possible, so that a new unit can be quickly and easily substituted for a defective one.

Yet another object of the invention is to maintain the number of interchangeable parts at a maximum.

Another object of the invention is to provide means for driving the belt past the display area and for guiding the parts of the belt which are leaving and entering this area into a number of storage loops located in spaces not occupied by the other parts of the registering mechanism.

A further object of the invention is to guide the belt into the storage loops and to drive the belt entering and leaving the middle loop at the same speed as that of the displayed portion of the belt.

Still another object of the invention is to provide means for controlling the entrance of the belt upon and the departure thereof from the belt driving mechanism.

Yet another object is to provide means for resetting the indicator belts to zero and means for freeing the indicator mechanisms from the count input drive during resetting.

These and other objects will become apparent from a study of this specification and the drawings which form a part thereof and in which:

FIGURE 1 is an elevation of the registering mechanism, and particularly a type thereof which has two individual superposed registers on each the front and back sides.

FIGURE 2 is an enlarged view of the mechanism of FIGURE 1 without a dial and housing.

FIGURE 3 is a top plan view of the mechanism of FIGURE 2.

FIGURE 5 is a sectional elevation which is taken substantially on the line 5—5 of FIGURE 3, showing the count advancing gear trains, the zero stop mechanism, and the differential mechanisms.

FIGURE 6 is a sectional view taken substantially on the line 6—6 of FIGURE 4, showing the input and differential gearing, the resetting shaft, and other elements which are mounted on the central frame module.

FIGURE 7 is an enlarged sectional view taken substantially on the line 7—7 of FIGURE 4, showing the lost motion connection between the resetting shaft and gear.

FIGURE 8 is a sectional view taken substantially on line 8—8 of FIGURE 15, showing the transfer and belt guiding and driving mechanisms.

FIGURE 9 is a sectional view taken substantially on line 9—9 of FIGURE 15, showing the count advancing soar train, including the drive gear for the belt sprocket drums and the belt control means.

FIGURE 10 is a section taken substantially on the line 10—10 of FIGURE 9, showing a belt drive sprocket drum.

FIGURE 11 is a section taken substantially on the line 11—11 of FIGURE 9, showing the drive gear and transfer disc for one order mechanism.

FIGURE 12 is a section taken substantially on the line 12—12 of FIGURE 9, showing the shock absorbing transfer pinion.

FIGURE 13 is a section taken substantially on the line 13—13 of FIGURE 12, showing the shock absorbing mechanism and positioning stops.

FIGURE 14 is a section taken substantially on line 14—14 of FIGURE 12, showing the pawl and ratchet associated with the transfer gear.

FIGURE 15 is a section taken substantially on the line 15—15 of FIGURE 9, showing the count advancing mechanisms of an entire register module and the belt guides.

FIGURE 16 is a section taken substantially on line 16—16 of FIGURE 8, showing the roller for controlling the entrance of the belt onto the sprocket drum.

FIGURE 17 is a section taken substantially on line 17—17 of FIGURE 9, showing a spacer and belt loop guide stud.

FIGURE 18 is a view of the belt guiding means.

Figure 4:
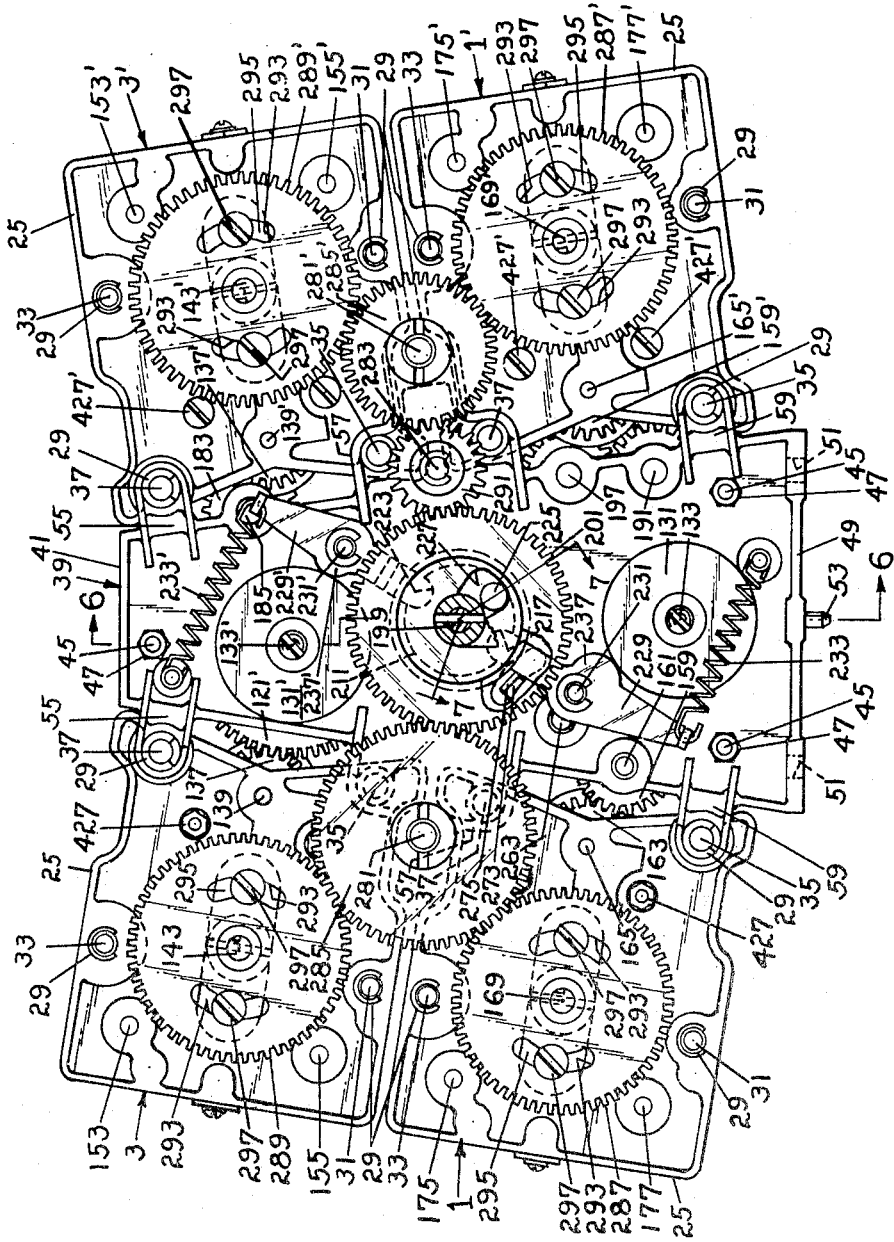
FIGURE 4 is an end elevation of the mechanism shown in FIGURE 2 and viewed from the right end thereof, showing the resetting gear trains and the brake mechanisms.

GENERAL CONSTRUCTION
(FIGS. 1 to 4 Inc.)

The registering mechanism disclosed for purposes of explanation is one which is capable of use in a computing motor fuel dispenser. It is, of course, obvious that the principles may be applied to a register for any other application and that mechanism is not limited in use to a dispenser registering mechanism.

FIGURES 1 and 2 show a gallons register 1 and a cost register 3 disposed above the gallon register, the tenths, units, and tens belts 5, 7 and 9 and 11, 13 and 15, respectively, of the two registers are visible through openings 17 in the dial plate 19. Pointers 21, 23 are disposed adjacent the first order (tenths) belts to indicate the exact zero position to which the zero numerals must be reset as a starting position.

As seen in FIGURES 3, 4 and 5 two additional registers are provided on the side opposite that shown in FIGURES 1 and 2, 1' being the gallons and 3' being the cost register. The additional registers are operated in synchronism with the corresponding registers of FIGURES 1 and 2.

Referring now to FIGURES 2 through 5, it will be seen that the registers 1, 1', 3 and 3' are in the form of individual units or modules which are constructed in basically the same manner, and for this reason only the gallons register 1 will be described in detail.

The registers have right and left end plates 25, 27 respectively which receive the ends of various rods and shafts which will be described in detail below. The end plates are held apart and in spaced, generally parallel, condition by tubes 423 (FIGS. 15 and 17) and by the hubs of the parts which are mounted or stacked on the various shafts and rods. They are prevented from coming off the shafts, etc., by snap rings 29 which are mounted in circumferential grooves, disposed outside of the end plates and formed in the rods 31, 33, 35 and 37 (FIG. 4).

The base frame or module 39, as seen in FIGS. 3, 4 and 6 comprises upstanding end plates 41, 43 which are rigidly held in spaced, parallel relation by three shouldered rods 45, the threaded ends of which extend through the end plates and receive nuts 47. A support 46 is fixed to and depends from the upper rod 45 and has a boss 48 which supports the upper end of an input shaft 63 which is the money or cost shaft of a variator when used in a dispenser.

Each end plate is provided with an outwardly extending flange 49 at the bottom which serves as a mounting foot. The flange is perforated at 51 to receive mounting bolts and with downwardly extending dowel pins 53 for accurately locating the registering mechanism relative to a variator or other support on which it is mounted.

As shown in FIG. 4, the end plates have laterally projecting upper, middle, and lower ears 55, 57, and 59 on each side. The side edges of the end plates may converge upwardly so as to position the individual registers so as to display the indicia on the indicator belts in an inclined plane instead of in a vertical plane, to provide easier readability and illumination when they are incorporated in a dispenser. Obviously the center module may be constructed to present the belts in a vertical or in any other desired inclined plane, within reasonable limitations.

The ears 55 are perforated to pass the ends of the rods 37 of registers 3 and 3'; the middle ears have two perforations each, to pass the shafts 35 of registers 3 and 3' and the shafts 37 of registers 1, 1' while the lower ears 59 are perforated to pass the shafts 35 of registers 1, 1'. The snap rings 29 seated in circumferential grooves in the rods prevent withdrawal of the rods through the ears (FIG. 17) and tubes 423 surround the rods and enter sockets 425. Thus each register is mounted on the center module 39 by shafts 37 and 35 respectively and can be removed therefrom by merely removing one of the snap rings from each of the two shafts and withdrawing the shaft from the ears and the end plates of the associated register. To install a replacement register this process is merely reversed. As noted above, the register is held assembled by the other shafts 31, 33 and their respective snap rings.

All of the gear trains connecting the counting and resetting input shafts, etc., which are mounted in the center module, with the mechanisms which form a part of the individual register modules mesh, or unmesh in the general area adjacent the inclined sides of the end plates 41, 43 so that the described removal and replacement of the register modules can be easily effected in the manner just described.

Any of the register modules may be omitted at will without affecting the proper functioning of the remaining structure. Thus a single-faced cost and gallons register can be provided by merely omitting the registers 1 and 3 or 1' and 3'. A double-faced gallons register can be provided by omitting registers 3 and 3'. A twin counter for registering two different inputs can be provided by omitting register modules 1 and 3 or 1' and 3' and by driving the input shafts 61 and 63 independently.

Accordingly, it will be seen, the modular structure described is versatile and flexible and can provide various arrangements to perform various functions. It is also constructed so that a damaged or disabled register can be quickly and easily replaced.

CENTER MODULE AND REGISTER ADVANCING GEAR TRAINS
(FIGURE 6)

Referring particularly to FIGURE 6 which shows the center module, it will be seen that two counting input shafts 61 and 63 are provided. The shafts drive bevel pinions 65 and 67, and are driven by mechanisms, the outputs of which are to be registered.

In the double-faced cost and gallons register shown for purposes of explanation, shaft 61 is the gallons shaft of a speed variator common used in motor fuel dispensers and 63 is the cost shaft, which reflects the product of the total gallons and the price per gallon.

Pinion 65 meshes with a bevel gear 69 fixed to the shaft 71 which, at the left end, projects through a bearing opening in the left end plate 43, through a boss 73 of a bracket 75, and has a bevel pinion 77 pinned to its end. A thrust collar 79 is pinned to the shaft 71 inside the end plate and bears against it so that, with the gear 77 and boss 73, it limits axial motion of the shaft.

As shown in FIGURES 2 and 3, the bracket 75 bends outwardly at right angles to the end plate 43 and is provided with a second bearing boss 81 which supports one end of a drive shaft 83 which projects from a cumulative counter 85. A pinion 87 is fixed to shaft 83 and is held in mesh with pinion 77 by the bracket. Thus the gallons revolution of shaft 71 are totalized on counter 85.

A similar structure is provided for the cost shaft 91 which is driven by cost input shaft 63 by way of pinions 67 and 89. The shaft is provided with collar 93, passes through a bracket 95 and carries pinion 97. The latter drives pinion 99, shaft 101 and the cumulative cost counter 103 (FIGS. 2 and 3).

These counters have the usual shutters (not shown) which are held closed by springs 105 and which are manually opened by pulling on wires 107.

Referring again to FIGURE 6, the right-hand ends of shafts 71 and 91 drive differential mechanisms 109, 109' respectively which are identical, so that only the 109 unit will be described. The corresponding parts of 109' will be indicated by corresponding primed numerals when they are referred to.

The structure 109 comprises an elongated flanged bushing 111 which is inserted from the right (FIG. 6) through a hole in the end frame 41. The flange is screwed onto the frame at 113. A planetary carrier 115 is rotatably mounted on the exterior of the portion of the bushing which extends through the frame. Two bevel planet gears 117 are mounted on the carrier to rotate on an axis 119 which is perpendicular to the rotative axis of the carrier and shaft 71. A count advancing gear 121 is fixed to the carrier 115 to rotate therewith.

A bevel sun gear 123 is pinned to shaft 71 and meshes with the planet pinions. The shaft extends through gear 123, a spacer 127, and into the hub 125 of a second sun gear 129, which is rotatably mounted in bushing 111 and which meshes with the planet gears. The hub 125 extends beyond the flange of the bushing and a friction disc 131 is fixed coaxially on the end of the hub by a screw 133 to rotate with the hub. The spacer 127 holds the sun gears in proper spaced relation so that they cannot bind the planet gears.

The differential 109' is similarly constructed and has a count advancing gear 121', a carrier 115', first and second sun gears 123', 129', and a friction disc 131'.

Shaft 61 rotates clockwise when viewed from the top of FIGURE 6 while shaft 63 rotates counterclockwise; shafts 71 and 91 rotate clockwise and counterclockwise respectively when viewed from the right of FIGURE 6. Accordingly, when the friction discs 131, 131' are locked, which is their condition when a count is being registered, sun gears 129, 129' will be stationary and as a result the carriers 115 and 115' will rotate clockwise and counterclockwise respectively, viewed from the right of FIGURE 6.

It will be seen from FIGS. 3 and 5 that the lowest order indicator advancing mechanism of register 3, indicated generally by 135, is driven directly by a train comprising gear 121', an idler gear 137 rotatable on shaft 139, and gear 141 which rotates on the resetting shaft 143 and drives both gears 145 and 147 which are connected with the belt sprocket drums 149 and 151. These drums are rotatable on shafts 153 and 155 respectively and drive the lowest order indicator belt 11.

The lowest order indicator advancing mechanism of register 1, indicated generally by 157, is driven by a train comprising gear 121, a reversing gear 159 rotatable on a stud 161 mounted in end plate 41, an idler 163 rotatable on shaft 165, and a gear 167 rotatable on reset shaft 169, which drives gears 171, 173' rotatable on shafts 175, 177, and which are fixed to the sprocket drums 179, 181 for the lowest order indicator belt 5.

It will thus be seen that while gears 121, 121' rotate counterclockwise and clockwise respectively (FIG. 5) the gears 145, 147, 171, and 173 all rotate counterclockwise to rotate the respective sprocket drums 149, 151, 179, 181 in the same direction so that the belts will move in an upward direction past the dial apertures which define the numeral or indicia display zone.

Since the lowest order belts of the register modules 1' and 3' are at the opposite end from that nearest the observer in FIG. 5 it is necessary to provide jack shafts to connect the gears 121 and 121' to drive these belts.

The center module mounted portion of the count advancing gear train for register 3' comprises gear 183 which meshes with 121' and which drives a jackshaft 185, mounted in gearing ears (not shown) on the center module end plates. The shaft has a gear 187 fixed to it which drives the register mounted portion of gear train which includes gears 137', drive gear 141', 145', and 147' and rotates the sprocket drums 149', 151' in a clockwise direction (FIG. 5) to move the belt 11' upwardly through the indicia display zone.

Similarly the count advancing gear train for register 1' comprises gears 121, 189, jackshaft 191 (mounted in the center module), a gear 193, reversing gear 195, which is rotatably mounted on a stud 197 set in end frame 43, idler 163', drive gear 167', gears 171' and 173', the sprocket drums 179', 181', and the belt 5'. The four last mentioned gears constitute the portion of the train which is mounted on the resistor module. The shafts on which the various gears are mounted are indicated by corresponding primed numerals as the corresponding shafts of register 1.

It will thus be seen that the register advancing drive trains can be parted by merely unmeshing the idler gears of the individual register units from the last gear of the corresponding center module mounted portion of the train. Also all of the register mounted portions of these gear trains are identical.

CENTER MODULE AND RESETTING GEAR TRAINS

Referring again to FIGURE 6, a shaft 199 is rotatably mounted in bearings in the end plates 41, 43 of the center module. The shaft is adapted to be rotated in a counterclockwise direction as viewed from the right of FIGURE 6 or in a clockwise direction as seen in FIGURE 5, by any suitable means such as a resetting motor or the hand crank 203 which is shown fastened to the shaft by a set screw 207.

A gear 201 of the resetting gear train is rotatably mounted on the shaft and the hub of the gear is centrally recessed at 209 (FIGS. 6 and 7) to receive the hub of a control element 211 which is pinned to the shaft 199 at 213. The control element comprises a radial flange 215 having a rounded notch 217 in its periphery (FIG. 4). A spacer 219 separates this flange from a ring 221 which has a rounded notch 223 (FIG. 4) formed in it in a position diametrically opposite to notch 217. The ring, spacer, and flange are suitably fixed together, so as to rotate as a unit, by means which includes a shouldered pin 225 (FIG. 7) the large free end of which extends through a lost motion slot 227 in gear 201 (FIG. 4) and the small end of which extends through the elements 215, 219, 221 and is riveted over to hold the elements together. The pin 225 normally rests in the left end of slot 227 as shown in FIG. 4.

When shaft 199 is rotated counterclockwise, it will rotate independently of gear 201 through the distance permitted by the slot 227 and will rotate control element 211. Thereafter, pin 225 will drive gear 201 counterclockwise.

As seen in FIGURE 4, brake levers 229, 229' are pivotally mounted on studs 231, 231' set in the end frame 41 and are held in place thereon by spring clips. The outer ends of the respective levers are connected to springs 233, 233' which urge them counterclockwise, while the inner ends are rounded so as to enter the rounded notches 217 and 223 respectively, of the flange 215 and ring 221. The lever 229' is offset at 235 so as to overlie the ring (FIG. 6).

The levers each have a braking projection 237, 237' which are held by their springs in frictional engagement with the respective friction discs 131, 131' respectively of the differentials 109, 109'. It will thus be seen that before the pin 225 picks up the gear 201, the control element will have rotated the levers 229, 229' clockwise to withdraw the braking projections from the discs to free them for rotation. When the shaft 199 completes a full cycle of operation, as described below, the rounded ends of the brake levers reseat in the notches and relock the discs.

Referring to FIGURE 5, it will be seen that the gears 121, 121' are provided with zero stops 239, 239' which are punched out of the metal of the gears. These stops cooperate with a lever 241 which has a hook 243 and a stop arm 245 against which the respective zero stops strike to stop the resetting of the indicator belts with their zero indicia centered with pointers 21, 23, etc.

Lever 241 is pivotally mounted on shaft 199 between two collars 247 and 249 (FIG. 6) which are pinned to the shaft. Collar 249 also carries a radial cam or projection 251. The lever 241 is provided with an elongated slot 253, disposed at an angle to the general longitudinal axis of the lever, which receives the pin 255 of a crank 257 which is pivotally mounted on a stud 259 set in the end plate 41.

As the shaft 199 is rotated clockwise (FIG. 5), the cam 251 will, toward the end of such rotation, strike the crank and rotate it counterclockwise (FIG. 5). The crank pin acting in the slot 253 rotates the lever 241 clockwise to position the hook and stop arm 243, 245 in the path of the zero stops.

A latch pawl 261 (FIG. 5) is pivoted on a stud 263 set in the end plate 41 parallel to shaft 199. The pawl has an upwardly extending arm provided with a latching ear 265 which extends toward the observer and which is adapted to move into position over a tooth 267 of lever 241. The pawl also has a perforated ear 269 to which one end of spring 271 is hooked. The other end of the spring is hooked in a hole in stop arm 245 so that both lever 241 and pawl 261 are urged counterclockwise (FIG. 5) by the spring.

The latch pawl has another arm 273 which lies underneath spring 271 (FIG. 5) and has its upper end 275 bent downwardly out of the plane of the lever so as to pass through an arcuate slot 277 in the end plate 41 (FIG. 4) and to project into the path of the upper arm of brake lever 229 so as to be operated counterclockwise thereby when the rounded end is returned to its notch 217 at the end of resetting.

The rotation of latch pawl 261 induced by lever 229 is counterclockwise in FIGURE 4 and clockwise in FIGURE 5 and it will be obvious from the latter view that such motion will disengage the latch ear 265 from tooth 267 so that spring 271 will rotate stop lever 241 counterclockwise removing it from the path of the zero stops 239, 239'.

In order to view the operation of the above described mechanism as a whole, it will be seen that the initial counterclockwise rotation of shaft 199 from the position shown in FIGURE 4, within the limits of the lost motion provided between pin 225 and slot 227, will cause the control element 211 (FIG. 7) to rotate the brake levers 229, 229' clockwise to free discs 131, 131' and therefore the sun gears 129, 129' of the differentials 109, 109' for rotation. The opposite sun gears are held against movement because the apparatus driving shafts 61, 63 have stopped.

After the lost motion has been taken up, pin 225 drives the gear 201 counterclockwise (FIG. 4).

The described clockwise rotation of brake lever 229 allows ear 275 (FIG. 4) of the latch pawl to be moved counterclockwise (FIG. 5) by its spring 271, so that latch ear 265 rests against lever 241 below tooth 267. Thus when lever 241 is subsequently rotated clockwise (FIG. 5) by cam 251 and crank pin 255, the latch ear will move into position over tooth 267 to prevent counterclockwise rotation of lever 241 out of the path of the zero stops when they strike it. Accordingly, the clockwise rotation of the shaft 199 (FIG. 5) and the gear 201 is definitely halted.

The notches 217 and 223 of the control element have passed counterclockwise (FIG. 4) beyond the ends of brake levers 229, 229' a predetermined distance when the zero stops halt the rotation of the parts, so that it is now necessary to rotate shaft 119 clockwise before the counting operation can be started. This motion can be performed either manually or automatically by a kick back mechanism of known construction. Such clockwise rotation first moves the pin 225 toward the opposite end of slot 227 and thereafter moves gear 201 through a predetermined arc in the same direction. It also moves the notches of the control element into position under the rounded ends of the brake arms so that the latter can be returned to their initial positions by their springs and in doing so they stop the returning control element, shaft 119, and gear 201 in their initial positions. The arms again brake the discs 131, 131' to lock the sun gear 129, 129'.

The described return movement of brake lever 229 cams the ear 275 to the left (FIG. 4) and thereby moves the latch pawl 261 to its initial position causing it to unlatch stop lever 241 so that it too will be restored by spring 271 to its initial position out of the path of the zero stops. The gears 121, 121' may now be rotated by shafts 61, 63 to accumulate a count. The clockwise movement of gear 201 just described performs an important function which will be explained below.

Returning to the structural description, it will be seen from FIGURE 5, the ears 57 of center module end plates have lateral extensions 279, 279'. The extensions 279 provide bearings for each end of the shaft 281 while 279' provide bearings for the shaft 281'. In addition a stud 283 is mounted on the right-hand ear 27 (FIG. 4) parallel to shaft 199.

Referring to FIGURE 4, a gear 285 is rotatably mounted on shaft 281 so as to mesh with gears 287 and 289 of the register modules 1 and 3 respectively. This gear 285 also meshes with gear 201 which, as it rotates counterclockwise, will rotate both of the gears 287 and 289 counterclockwise.

Gear 201 also drives the reversing gear 291 which is mounted on stud 283, to drive gear 285', and the gears 287', 289' of the modules 1' and 3'. The gears 287', 289' of course rotate clockwise.

The gears 287, 289, 287' and 289' are rotatably mounted on the ends of their respective resetting shafts 169, 143, 143' and 169' and have diametrically opposed arcuate slots 293 formed therein. A bar 295 (FIGS. 4 and 15) is fixed, by a central hub and a pin, to each of the resetting shafts and has a tapped hole in each arm to receive a screw 297 passed through the adjacent slot. Thus each resetting shaft can be rotated through a limited arc, relative to the corresponding gear 287 which is always stopped in the same rotative position by the zero stop mechanism described above, in order to enable the resetting shafts to be adjusted to bring the zero indicia of the indicator belts into accurate alignment with the pointers 21, 23.

It will again be noted that the resetting drive trains of all of the register modules are arranged so that the register modules are free to be removed and replaced individually since the gears 287, 289, 287', and 289' are easily separable from the rest of their respective resetting trains which are mounted on the center module. It is obvious, of course, that to install a register module, the resetting gear of that unit should be first actuated to restore all of the belts to their zero indicating positions before the gear is brought in mesh with the rest of the train which should also have been first reset.

As was stated above, the rounded ends of the brake levers 229, 229' reenter the notches 217, 223 and stop the clockwise rotation of shaft 199 after a limited but definite clockwise rotation of gear 201 (FIG. 4) has occurred. This clockwise rotation of 201 is transmitted through the gearing just described, to the resetting shafts 143, 169, etc., which will be reversely rotated a corresponding amount. Such reverse rotation does not move the belts or drive gears 141, 167, etc., for reasons which will be explained in detail below, but it produces an important result in that it causes a rotation of the resetting shafts through more than 360 degrees upon each resetting operation which insures that all of the indicator belts be picked up and will be reset to zero each time the resetting operation is performed.

REGISTER MODULE-COUNTING STRUCTURE

The following description of the register modules will refer particularly to the register numbered 1, although it will be understood that the remaining three registers are similarly constructed.

As described above and shown in FIGS. 3, 5, and 9 the gear 163 is driven clockwise (FIG. 9) by the gear train 121, 159 of the center module to drive the drive gear 167 and pinions 171 and 173 so as to rotate sprocket drums 149, 151 clockwise. The belt 5 will move upwardly through the display zone adjacent the aperture. The lowest order tape is therefore driven continuously so long as counting continues.

As will be seen from FIGURES 9 and 11, the drive gear 167 is a ring gear which is concentrically supported on an axial boss 299 extending from a stepping and locking disc 301. Pins 303 are fixed in the disc to enable the gear to drive the disc, which has a relatively long hub 305 journalled on the resetting shaft 169.

The boss 299 defines a shallow, concentric, circular cavity 307 which contains a resetting pawl 309 pivotally mounted on a pin 311 for engagement with an axially extending V-notch 313 in the resetting shaft. A U-shaped leaf spring 315 is disposed in the cavity, is supported on a pin 317 also seated in the disc, and extends around shaft 169 and into contact with pawl 309 so as to urge it in engagement with the shaft. A cover plate 319 is held in place by screws 321, which enter the disc, so as to close the cavity and retain the pawl and spring on their respective pins. The plate extends radially far enough to overlap about half of the ring gear so as to hold it in place on its pins.

It is obvious that if the shaft 169 is rotated counter clockwise, FIG. 9, the notch 313 will drive the pawl 309 and the disc with it, in the same direction. However, if the gear 167 is driven counterclockwise, the pawl 309 merely pivots against its spring so that the disc and gear 167 are free to move relative to the shaft, which remains stationary.

Referring now to FIGURE 8, it is seen that the disc 301 defines a notch 310 having curved sides which conform with two gear teeth 312 which are formed on the back side of the disc. The teeth 312 are adapted to mesh intermittently with four long teeth 323 and four short teeth 327, which are disposed in alternating sequence about the axis of shaft 169 to form a transfer pinion 325 which is rotatably mounted on the shaft 165. The teeth 312 engage both the short and long teeth of the transfer pinion whereas the periphery of the disc coacts only with two long teeth to prevent rotation of the pinion except when the notch passes it. Thus for each full revolution of the disc, the pinion will rotate 90 degrees.

As shown in FIGURE 12, the pinion 325 is rotatably mounted on the hub 329 of a cylindrical member 331 which is journalled on shaft 165 and is held thereon by a snap ring 330. The end of the member adjacent the pinion is provided with a generally annular cavity 333 which does not extend for the full circumference of the roller but has a stop sector 335 which fills a portion of the cavity.

The pinion 325 has an axially extending tang or stoplug 337 which extends into the cavity and is adapted to engage the stop and is urged into such engagement by a coil spring 339 which has one end hooked on a pin 341 also mounted on the pinion so as to extend into the cavity and its other end hooked onto a second pin 343 which is mounted in the member 331 so as to extend into the cavity. The tang and pins extend substantially parallel to the axis of the shaft.

Since the pinion 225 is moved clockwise, FIGS. 9 and 13, by the disc teeth, the tang 337 in FIG. 13 will move clockwise. The pinion is accelerated rapidly at high counting speeds and, to reduce the acceleration of the drum and other parts which must follow the tang, the spring will stretch, permitting the tang and pinion to move clockwise, relative to the stop 335 and member 331 which will then be driven by spring 339 to follow and reengage the tang 337 when the pinion is in stationary, locked condition. Thus a shock absorbing structure is provided which limits the impact load between the disc teeth 312 and the pinion teeth, and reduces the rate of acceleration which is imparted to the member 331 and its associated parts by allowing them to lag behind the pinion and then catch up with it.

The right end of member 331, FIG. 12, has a boss 345 of reduced diameter and another hub 347 which rides on shaft 165. A transfer gear 349 has a rather long hub 351 which is telescopically mounted on hub 347 and is inserted through an opening 353 in a cap 355 which fits on the boss 345. The end portion of the gear hub is notched at 357 so as to constitute a ratchet. The rim of the cap is longer than the boss 345 so that a chamber 357 is defined between them, into which the end of the gear hub 351 extends. The member is provided with a number of axially extending projections 359 which lie above the periphery of the boss 345 and enter corresponding axial notches in the rim of the cap so that the cap will rotate with the member.

As seen in FIGURE 14, a pin 361, set in the end of the boss, extends axially into the chamber 357 and serves as the pivot for a pawl 363. One arm 365 of the pawl extends toward the shaft 165 and has a rounded end adapted to enter any one of four equally spaced axial notches 367 of the ratchet on gear 347. The other arm of the pawl extends circumferentially inside the rim of the cap and has a notch 369 which receives the free end of U-shaped leaf spring 371, the other end of which is formed into an eye which is slipped over a pin 361 and into the chamber. A washer 375 or other spacer is inserted between the gear and the cap to position the ratchet in the chamber and to hold the cap on the boss.

It will thus be seen that when the member 331 rotates clockwise on the shaft 165, FIGURE 14, in response to the operation of the transfer pinion, the pawl arm 365 will drive the hub 351 and the gear 349. However, the gear may be rotated clockwise, FIGURE 14, independently of the member while the pawl merely glides over the ratchet.

As seen in FIGURE 15, two transfer mechanisms, each comprising a transfer pinion 325, member 331, cap 355, and output gear 349 are mounted end to end on the shaft 165 adjacent the two lower order mechanisms, and a sleeve 377 is slipped on the shaft adjacent the highest order mechanism to fill the remaining space and thereby to maintain the transfer mechanisms in their proper positions on the shaft.

In operation the first drive gear 167 drives the sprocket drums of the belt 5 and the stepping disc 301 as seen in FIGS. 8, 9, and 15. The teeth 312 on disc 301 advance the transfer pinion ¼ of a revolution for each revolution of the disc. This rotation is transmitted to member 331 by the shock absorbing mechanism of FIG. 13 and from the member through pawl 363, and ratchet (FIG. 14) to gear 349, which is the equivalent of gear 163, in that it actuates the drive gear 167 for the second order belt 7. The latter gear drives gears 171, 173 and the drum sprockets 149, 151 on which the belt 7 is mounted The output gear 349 for the second transfer mechanism actuates the drive gear 167, etc., for the third order belt 9. The disc 301 for the third order mechanism performs no transfer function.

It is seen in FIGURE 3 that the discs 301 are provided with relatively long hubs 305 and that the drive gear and disc assemblies 167, 301 are all mounted in tandem, endwise abutting relation on the reset shaft 169 so that the hubs 305 serve as spacers which hold the gears 167 in position for meshing with the associated gears.

REGISTER MODULE—RESETTING STRUCTURE

It has already been explained above that the drive gears 167 of the various orders of belts of register 1 rotate counterclockwise (FIG. 9) during counting operation. Accordingly, the pawl 309 will merely move around the resetting shaft 169 which is, of course, stationary because the resetting gears (FIG. 4) are not in motion.

However, when resetting gear train 201, 285, 287 is rotated by crank 203 or otherwise, the resetting shaft 169 will be rotated counterclockwise (FIGURE 9) and the V-notch 313 will pick up the pawls 309 for the various orders and will move all of the belts to the position in which the zero indicia are displayed. The drive gears 167 of these orders will, of course, be driven counterclockwise, FIGURE 9, to rotate gear 163 and the output gears 349 and ratchets 351 of the transfer mechanisms clockwise, FIG. 14. The ratchets will cam the pawl arms 365 (FIG. 14) out of engagement and the transfer pinions 325, members 331, and caps 335 will be relatively unmoved so long as the peripheries locking discs 301 engage the long teeth 323 of the transfer pinions 325 and will step whenever the teeth 312 on the discs pass the pinions. Teeth 312 occupy substantially the position shown in FIG. 8 when the belts are in zero indicating positions so that each of the transfer pinions will index only one step during the resetting operation. Since resetting rotation of the resetting shafts 143, 169, etc., is always stopped with the V-notch in the same rotative position, the belts always stop in their zero indicating positions at the completion of the resetting operation.

REGISTER MODULE—BELT DRIVES

By reference to FIGURES 8 and 10 it will be seen that each of the shafts 175, 177 of the Register 1 are loosely mounted in sockets 379 formed in the register end frames 25. Shaft 175 and the lowest order belt drum 144 are shown in FIG. 10 but all of the rest of the corresponding registers are similarly constructed.

The belt drums 149, 151 are formed in two parts 381, 383. Part 381 of drum 149 comprises a cylindrical outer flange 385, a hub section 387, and a radial flange 389 which connects the inner end of the flange 385 with about the middle portion of the hub. Gear 171 which drives the hub part 381 has a hub 391 extending from one end which carries a radial flange 393 which has teeth or other projections 395 extending from its periphery and in engagement with mating internal teeth 396 which are preferably molded in the hub 387. Both the hub 387 and the gear 171 rotate freely and in unison on shaft 175.

The hub 387 is formed with a section 397, preferably of slightly smaller diameter, which extends to the right from flange 389, FIG. 10, and a relatively thin sprocket 399 is mounted on the shoulder. The teeth 401 of the sprocket are made long enough to project somewhat beyond the outer surface of the flange 385. The teeth 401 are preferably of rectangular crossection but the four sides thereof preferably converge outwardly, so that the teeth will enter and leave the perforations of the belt without binding or cutting it. The tooth crossection immediately adjacent the surface of the drum is preferably substantially the same size and form as the holes in the belt.

The second part 383 of the drum comprises an outer cylindrical flange 403 which terminates at its left end, FIG. 10, in a radial flange 405 which has an opening to closely fit on the portion 397 of the hub. Rivets 407 are passed through the radial flanges and the sprocket to hold the parts together. The outer surfaces of the cylindrical flanges have the same diameter and provide a smooth surface upon which the belt rests.

NUMERAL BELTS, ARRANGEMENT AND SUPPORT

The various numeral belts 5, 7, 9, etc., are preferably woven from glass fibers and lightly impregnated with a black plastic material such as "Nylon." The numerals are of white plastic material such as "Nylon" and are hot pressed on and into the belt in the desired positions. This process may be reversed so that the numerals are black and the belt white and other colors may be used if desired.

Each belt has a single line of equally spaced rectangular perforations 409 punched down the longitudinal centerline thereof to receive the teeth of the sprockets 399. The spacing of the perforations is, of course, the same as that of the sprocket teeth so that the belt will ride smoothly on the drums. The belt may be made from tape material cut to the proper length and having the ends cemented together or otherwise joined.

The rods 31 and 33 previously described, are provided with a roller 411 for each belt, as shown in FIGURE 16. The rollers are preferably of plastic material and are made in two like parts which are cemented together at the center, so that each roller has axially outwardly extending hub portions 413, two radial flanges 415 which are spaced axially far enough to freely receive the width of the belt without much clearance, two cylindrical land portions 417 which are disposed immediately inside the flanges and have an axial width such that they engage the margins of the belt, preferably up to but not beyond the area occupied by the numerals and a central cylindrical portion 419 which is of slightly less diameter than the lands so as to clear the tape. A spacer 421 is provided between the end plate 25 and the adjacent roller.

The register mounting pins 35, 37 previously described, which are held in place by snap rings 29 are each surrounded by a belt guide tube 423, FIGURE 17, which has its ends inserted in counterbores 425 formed in the end frames, substantially concentric with the pins. The exterior surface of the tube is made very smooth because it comes into contact with the moving tape and could abrade it. It is preferred to chrome plate and polish the exterior surface of the tubes.

A pair of bolts 427 are passed through both end plates 25 and 27 of each register and are located closely adjacent the members 331 and discs 301, FIGURES 4, 5, 8, 9, and 15. In registers 1' and 3' these bolts are indicated by 427'. In each case the bolts support belt guide means 429, FIGURES 4, 15, and 18, one for each belt, in side by side relation.

Each guide is made up of two complementary parts or halves 431, 433 (FIG. 15) which are preferably die cast and chrome plated to reduce the friction between the guide and tape.

The guide parts have a general U-shape in elevation, FIGURE 18, and the free ends extend near to and past the tubes 423. The closed end of the guide protrudes from the main part as at 435 so that it may enter between the sprocket drums far enough to be approximately tangent to a line connecting the central axes of drums 149, 151. This protruding portion is connected with the remainder of the guide part by two reversely curved portions 437 which extend substantially parallel to and in closely spaced relation with a portion of each of the drums 149, 151.

As will be seen in FIGURE 15, the outer edges of the guide parts have a raised portion or longitudinal rib 439 which in the curved portions 437 is disposed about the thickness of the tape from the surfaces of drums 149, 151. The abutting edges of the parts are rabbeted so as to form a groove 441 into which the teeth of the respective sprockets 399 may extend. The ribs thus serve to hold the tapes on the sprocket teeth in these regions.

The outer sides of the free ends of the guide are formed with vertical wings 443 which are spaced apart about the width of the tape to limit lateral displacement thereof along the guide tubes 423.

Bosses 445 are provided near the free ends of the guide parts to receive the bolts 427 for holding the guide parts assembled and aligned with each other and the irrespective drums.

As seen in FIG. 8 particularly, the belt 5 passes in a run A from the lower sprocket drum 151, through a viewing or numeral display zone adjacent and behind the aperture 17 in the dial and onto and partially around the upper sprocket drum 149. A length of the belt which is, at least, sufficient to display an entire numeral, and preferably slightly more, is thus held in a planar condition in the display zone, close to the aperture.

From the upper drum, the belt passes under the top roller 411 which controls the departure of the tape from the sprocket drum, and is trained over, around, and under the upper guide tube 423 in a loop B. The side of the loop which is leaving tube 423 then passes along the upper side of guide 429 between the wings 443 thereof, and is guided by ribs 439 again into engagement with the upper sprocket drum and is driven by the sprocket into a second loop C. On leaving this loop, the belt enters between the bottom side of the guide 429 and the sprocket drum 151 where it is again drivingly engaged by the sprocket. Since the two sprocket drums are identical and rotate at the same speeds, the belt is fed into and out of loop C at a constant speed so that the size of the loop remains the same at all times.

On leaving the second loop and the sprocket drum 151 the belt is trained into a third loop D, over, around, and below the lower tube 423 and over the lower roller 411 which guides the belt onto and controls its entrance upon the lower sprocket drum 151 for passage again through the display zone.

While the loops B, C, and D are in effect free, they are controlled as to lateral position by the wings 443 and roller flanges 415 and as to length by their engagement by the sprocket teeth both on the feed-in and feed-out runs of the tape in these loops.

GENERAL OPERATION

The registering mechanism operates as follows: Shaft 199 (FIGURES 4, 5, and 6) is first driven counterclockwise (FIG. 4), either manually or by a motor, to reset all of the registering tapes and thereafter in a clockwise direction through a partial revolution. The gear 201 is not moved at first and does not move until pin 225 travels the length of slot 227 to pick up the gear.

During the lost motion travel of the shaft 119, the control element 211 rotates the brake levers 229, 229' clockwise to free the discs 131, 131' and the sun gears 129, 129' of the differentials 109, 109' (FIG. 6) so that the gears 121, 121' may be driven without disturbing input shafts 61, 63, 71, and 91, which are stationary.

The rotation of the resetting shafts 143, 169, 143', 169' which are driven by the gear trains shown in FIGURE 4, causes the resetting pawls 309 of all of the drive gears 141, 141', 167, 167' to be picked up by the V-grooves in the resetting shafts so as to drive said gears in the proper directions to advance all of the indicator belts, in a count advancing direction, to their zero indicating positions which are determined by the contact between the zero stops 239, 239' on gears 121, 121' with the previously positioned hook and stop arm of lever 241. These stops prevent further counterclockwise rotation (FIGURE 4) of shaft 119 and gear 201.

The shaft 119 will then be rotated clockwise a partial revolution to reengage the brake levers 229, 229' with the notches in the control element 211 and to return them to their initial positions. As lever 229 returns, it moves the latch pawl 261 clockwise (FIG. 5) to release lever 241 and both return to their initial positions.

The return of the brake arms to their initial position also relocks the discs 131, 131' so that subsequent rotation of shafts 61, 63 will be transmitted to the gears 121, 121' (FIG. 5) to advance the lowest order tapes.

During the clockwise movement of shaft 119, the pin 225 moves to the left end of slot 227 and preferably rotates the gear 201 clockwise through a limited arc to cause the V-notches in the resetting shafts to back away from the pawls 309, so that on a subsequent resetting operation, the V-notches will rotate more than 360 degrees to reengage the zero stops. This insures that all of the pawls 309 will be engaged with the resetting shaft notches and that all of the belts will be returned to zero.

When the shafts 61, 63 are now rotated in their advancing directions, the gears 121, 121' will drive the lowest order belts and sprocket drums in the count advancing direction by means of the gear trains shown in FIGURE 5. This action continues until the shafts 61, 63 are stopped.

As each lowest order tape moves to the position in which the numeral 9 is leaving the display zone and numeral 0 is moving into view, the teeth 312 of the transfer disc, FIGURE 8, advance the transfer pinion 325 one fourth of a revolution. If the rate of rotation of the disc is relatively slow, the member 331, FIGURE 12, may follow the pinion exactly. If the rate is high the drum may lag behind the pinion stretching spring 339, FIGURE 13. The spring will cause the drum to catch up with the pinion at least after the pinion stops. This arrangement reduces the shock loads which would otherwise be imposed on the transfer mechanism and the next order indicating mechanism.

As seen in FIGURE 14, the member 331 drives ratchet 367 and transfer gear 349 by way of pawl 363 and the gear 349 drives the ring gear 141, 141' 167, 167' of the next higher order belt of the register. An additional transfer mechanism such as that described must be provided to advance each higher order belt.

The cumulative registers 85, 103 are advanced directly by the shafts 61, 63 and are not resettable.

If it is necessary to adjust the zero indicia of the belts of any register so that they will be in accurate alignment with the pointers such as 21, 23, FIGURE 2, all that need be done is to reset the registers, loosen the screws 297 of the particular register which is to be adjusted, so as to free the resetting shaft and spider 295 from the associated gear 287, 287', 289, or 289', and rotate the spider and shaft relative to the gear in the proper direction, making sure that the resetting pawls 309 remain fully engaged in the V-groove, until the zero indicia are properly aligned with the pointer. The screws 297 are then tightened to hold the adjustment.

As previously pointed out, any register may be removed from the center module by merely removing the clips 36 from one end of each of the pins 35, 37 for that register and withdrawing the pins from the center module end plates. To install a register, the resetting mechanism is established in its zero reset condition, the belts of the register to be installed are zeroized and the above described removal process is reversed.

One or more than one of the registers may be omitted without changing the operation of the remaining register or registers.

Further the number of decades or orders employed in the registers may be reduced by merely omitting all of the parts thereof and substituting spacers on the various shafts to hold the parts of the remaining decades or orders in their proper positions.

To increase the number of decades from that shown, it is necessary only to change the spacing of the end plates of the center and register modules, provide longer shafts and pins for those which span the end plates of the modules and insert the required number orders of indicating mechanisms and transfer mechanisms.

It will thus be seen that the structure is capable of great versatility in addition to being extremely compact, despite the fact that the numerals displayed are very large and therefore visible at long distances. Further, the numerals or indicia are displayed in a plane rather than in a cylindrical form which improves the legibility of the indicia. The registers are shown mounted so as to incline the plane in which the indicia are displayed so that they may be lighted from above. Further, the lighting is much more effective because of the planar presentation of the numerals in contrast to a cylindrical presentation because the lighting is uniform and no shadows are cast by any protrusion of the indicia bearing medium.

It will thus be seen that the structure disclosed presents numerous important advantages over prior art registering mechanisms.

In certain applications of the structure disclosed, various requirement must be met by the registering mechanism. As an example, when the structure is employed in a motor fuel dispenser, if the indicator belts are reset to zero in a direction which advances the count, as the described mechanism does, the resetting operation once started must automatically continue to a conclusion, or the display apertures must be shuttered until the resetting is completed. Power resetting devices and shutter mechanisms are well known in the prior art and may be added to the structure disclosed to meet such requirements, and it is deemed unnecessary to extend this disclosure to include any such structures herein.

Further, any person familiar with the art would be capable of changing the structure disclosed so that the resetting of the tapes would be effected in a count reducing direction so that it is not believed necessary to extend the disclosure to include such a modification.

Accordingly, applicants are aware that numerous changes, additions, and modifications of the structure, which they have disclosed for the purpose of illustrating their invention, are possible and they do not wish to be limited to the exact structure disclosed. Instead they desire protection which falls fairly within the scope of the appended claims.

We claim:

1. A registering mechanism comprising a basic module and a register module mounted thereon, said basic module including a frame,
   (a) first and second shafts rotatably mounted on said frame, a resetting gear disposed to be driven by said second shaft,
   (b) a differential mechanism comprising three coacting rotary elements, means connecting one of said elements for operation by said first shaft, a first count advancing gear connected with a second element,
   (c) said register module including a number of count indicating mechanisms arranged in successive orders, transfer means connecting each lower order to advance the next higher order mechanism, a resetting shaft associated with all of said indicating mechanisms for resetting them to zero,
   (d) means connecting said first gear to advance the lowest order mechanism, means connecting said resetting gear to drive said resetting shaft,
   (e) releasable brake means operatively associated with the third rotary element for normally holding said element against rotation to cause said first shaft to actuate said first gear through said first and second rotary elements,
   (f) means responsive to the rotation of said second shaft for releasing said brake means prior to the operation of said resetting gear, to free said first gear and said second rotary element for operation independently of said first shaft during the operation of said resetting means.

2. The structure defined by claim 1 which includes first zero stop means movable in a path, in timed relation with said count indicating mechanisms, second stop means movable into and out of said path, said second stop means, when positioned in said path, cooperating with said first stop means to stop the resetting of said mechanisms when they reach their zero indicating positions,
   (a) means responsive to the operation of said second shaft, during the resetting rotation thereof, for moving said second stop means into said path,
   (b) and means responsive to the reverse rotation of said second shaft, after the completion of resetting, for moving said second stop means out of said path and for restoring said brake means to hold said third element.

3. The structure defined by claim 2 which includes latch mean adapted to hold said second stop means in said path and wherein said means responsive to the reverse rotation of said second shaft includes means for rendering said latch means ineffective to hold said stop means.

4. A registering mechanism comprising a basic module and a registering module mounted thereon, said basic module including a frame,
   (a) first and second shafts rotatably mounted on said frame, a resetting gear, means connecting said gear to be driven by said second shaft,
   (b) a first, count advancing gear, means connecting said first shaft to operate said first gear in a count advancing direction, said connecting means including means for freeing said first gear for rotation independently of said first shaft,
   (c) said register module including a number of count indicating mechanisms arranged in successive orders, transfer means connecting each lower order mechanism to advance the next higher order mechanism, a resetting shaft, associated with all of said indicating mechanisms for resetting them to zero.
   (d) means connecting said first gear to advance the lowest order mechanism, means connecting said resetting gear to drive said resetting shaft in a resetting direction upon rotation of said second shaft in one direction.
   (e) means responsive to the rotation of said second shaft in one direction for operating said gear freeing means,
   (f) said means connecting said resetting gear with said second shaft comprising a lost motion device to enable said gear freeing means to be operated prior to said resetting gear.

5. A large numeral register comprising a frame, first, second, and third shafts mounted in substantially parallel relation in said frame, said second and third shafts being spaced apart and spaced radially from said first shaft,
   (a) a number of count indicating mechanisms arranged in successive orders in said frame, each mechanism including a first gear rotatably mounted on said first shaft,
   (b) a belt supporting drum for each mechanism mounted on each of said second and third shafts, each drum having a cylindrical, belt supporting surface, a sprocket having teeth extending radially beyond said surface and a gear connected to be driven from said first gear,
   (c) a numeral bearing indicator belt for each mechanism, having large single numerals arranged top to bottom, lengthwise of said belt, said belt defining a series of openings spaced longitudinally along said belt for driving engagement with said sprocket teeth,
   (d) each mechanism comprising means for guiding the associated belt in a predetermined path from one drum to the other through a numeral display zone and for supporting a portion of said belt, which is at least of sufficient extent to contain an entire numeral, in a substantially planar condition in said display zone.

6. The structure defined by claim 5 wherein said register frame and parts of said mechanisms define a number of unoccupied spaces adjacent each mechanism, said structure including means adjacent one of said drums of each mechanism for controlling the entry of the belt upon said drum and its sprocket, means adjacent the other one of said drums for controlling the departure of the belt from said other drum and its sprocket, (a) means for directing the portion of the belt running from the departure control means to the entry control means into a number of loops and for maintaining each of said loops in a different unoccupied space.

7. The structure defined by claim 6 in which the drums of each mechanism define a space which extends between them, a said belt directing means including belt guiding means for each mechanism disposed to direct and guide one loop of said belt into the space between the respective drums and to guide portions of the belt which form the sides of said loop into driving relation respectively with the sprockets of the drums nearest them respectively, said sprockets serving to maintain the length of said loop substantially constant.

8. The structure defined by claim 7 wherein said guiding means for said portions of the belt include a section disposed closely adjacent to the corresponding drum and sprocket and extending substantially parallel thereto for a portion of the circumference thereof, so as to hold the belt in driving relation with the sprocket.

9. The structure defined by claim 8 wherein the sections of said guiding means are each provided with a groove disposed in an alignment with the teeth of the corresponding sprocket to provide clearance for the tips thereof.

10. The structure defined by claim 7 wherein said belt directing means includes cylindrical supports disposed so as to extend through other loops of said belt to maintain such loops in their respective spaces.

11. A register comprising a frame, first, second, and third shafts mounted in substantially parallel relation in said frame, said second and third shafts being spaced radially from said first shaft, (a) a number of count indicating mechanisms arranged in successive orders in said frame, each mechanism including a first gear rotatably mounted on said first shaft, (b) a belt supporting drum for each mechanism mounted on each of said second and third shafts, each drum having a cylindrical, belt supporting surface, a sprocket having teeth extending radially beyond said surface and a gear connected to be driven from said first gear, (c) a numeral bearing indicator belt for each mechanism, said belt defining a series of openings spaced longitudinally along said belt for driving engagement with said sprocket teeth, (d) each mechanism comprising means for guiding the associated belt in a predetermined path from one drum to the other through a numeral display zone and for supporting a portion of said belt, which is at least of sufficient extent to contain an entire numeral, in a substantially planar condition in said display zone, (e) said second and third shafts being mounted so as to provide a substantial space between the drums, (f) means adjacent one of said drums of each mechanism for controlling the entry of the belt upon said drum and its sprocket and means adjacent the other one of said drums for controlling the departure of the belt from said other drum and sprocket, (g) means for directing the portion of the belt running from the departure control means to the entry control means into a first loop extending away from said departure control means, a second loop extending into the space between the drums and a third loop extending away from said entry control means and, (h) guide means disposed inside said second loop for guiding and holding the runs of said belt which enter and leave the second loop, into supporting and driving engagement with the corresponding drums and sprockets, whereby the length of said second loop is maintained substantially constant.

12. The structure defined by claim 11 wherein said belt directing means includes a cylindrical member mounted on said frame for each of said first and third loops, each of said loops passing loosely around the corresponding member, said members serving to limit the displacement of the respective loops in directions transverse to the member.

13. The structure defined by claim 11 which includes means mounted in said frame adjacent said cylindrical members and adjacent the edges of said first and third belt loops for limiting the movement of said loops longitudinally of said members.

14. The structure defined by claim 11 wherein said entry and departure control means comprise rollers mounted substantially parallel to the respective drums and closely adjacent thereto, to maintain the belt on the sprockets.

15. The structure defined by claim 14 wherein said rollers comprise radial flanges disposed to limit motion of the belt axially of the rollers and axial flanges extending inwardly a predetermined distance from the radial flanges to provide support for the belt only adjacent the marginal edges thereof.

16. The structure defined by claim 11 wherein the guide means for each mechanism comprises a generally U-shaped structure mounted edgewise in said frame, with the closed portion thereof extending between the drums, said U-shaped structure having portions on either side of the closed end curved in an arc which is substantially parallel with and extends part way around and in closely spaced relation with the respective drums, to hold said belt in driving relation with said sprockets.

17. The structure defined by claim 16 wherein said guide means portions define a groove to receive the tips of the respective sprocket teeth.

18. The structure defined by claim 16 wherein said guide means portions include marginal flanges disposed on each side of the belt to align said belt with said drums and sprockets.

19. The structure defined by claim 16 wherein said belt directing means includes a cylindrical member mounted on the frame for each of said first and third loops, each of said loops passing loosely around the corresponding member, said members serving to limit the displacement of the respective loops in directions transverse to the member and wherein the legs of the guide means extend past the inner sides of said members for the first and third loops of the belt, said legs having vertically etxending flanges disposed to engage the edges of the belt to position the belt axially of the members.

20. The structure defined by claim 16 wherein said U-shaped structure comprises two complementary parts each of said parts having hollow bosses extending transversely thereof, (a) a pair of rods mounted in said frame substantially parallel to said first shaft and spaced radially therefrom, said rods extending through said bosses to support the U-shaped structure upright in said frame.

21. A register comprising a frame, four shafts, mounted in substantially parallel relation in said frame, said first shaft being rotatable, said second and third shafts being spaced from each other and spaced radially from said first shaft, (a) a number of count indicating mechanisms arranged in successive orders in said frame, each mechanism comprising a first gear rotatably mounted on said first shaft, (b) a belt supporting drum for each mechanism mounted on each of said second and third shafts, each drum having a cylindrical, belt supporting surface, a sprocket having teeth extending radially beyond said surface and a gear connected to be driven from said first gear, (c) a numeral bearing indicator belt for each mechanism, said belt defining a series of openings spaced longitudinally along said belt for driving engagement with said sprocket teeth, (d) each mechanism comprising means for guiding the associated belt in a predetermined path from one drum to the other through a numeral display zone and for supporting at least a portion of said belt, which is of sufficient extent to contain an entire numeral, in a substantially planar condition in said display zone, (e) a transfer disc rotatably mounted on said first shaft adjacent each first gear, means for causing said gear and disc to rotate together, (f) means, including a transfer pinion, rotatably mounted on said fourth shaft, said disc including two adjacent gear teeth adapted to mesh with said pinion once during each revolution of said disc, to move said pinion a predetermined distance per revolution, (g) a drive pinion rotatably mounted on said fourth shaft, in a position to drive the first gear of the next adjacent count indicating mechanism and means, means including ratchet means for connecting said transfer pinion to actuate said drive pinion to thereby effect the advancement of the numeral belt of said next adjacent mechanism.

22. The structure defined by claim 21 wherein said means for connecting said transfer pinion to actuate said drive pinion includes yieldable means disposed between said transfer pinion and said ratchet means, arranged to permit movement of said transfer pinion relative to said ratchet means, to minimize the effects of the impact between the disc teeth and said transfer pinion.

23. The structure defined by claim 22 wherein said connecting means includes a member rotatably mounted on said fourth shaft, adjacent said transfer pinion, and having a first stop adapted to rotate in a path, said transfer pinion having a second stop disposed to rotate in said path, in advance of said first stop and in the direction of rotation of the pinion, and a yieldable device connected between said transfer pinion and said member for urging said first stop into engagement with said second stop so as to cause said member to follow said pinion and to stop in a rotative position corresponding to the rotative position of the pinion.

24. The structure defined by claim 21 wherein said register frame includes substantially parallel spaced end plates and wherein the combined axial lengths of the like components common to all of the count indicating mechanisms are substantially equal, said components being assembled for free axial motion on the respective shafts and being held in operative radial alignment with each other by said frame end plates.

25. The structure defined by claim 21 wherein said first shaft defines a longitudinally extending groove and wherein the transfer disc of each indicating mechanism includes a pawl mounted for movement to and from engagement with said groove, (a) a yieldable means for urging said pawl into engagement with said groove, (b) said groove and pawl being constructed and arranged so as to permit rotation of said disc relative to said first shaft in a direction to advance the indicator belt and so that rotation of said first shaft in the same direction will be transmitted to said disc, to advance said belt.

26. A registering mechanism comprising a basic module and a register module, (a) said basic module comprising a frame, first and second shafts rotatably mounted in said frame, (b) a portion of a register advancing gear train mounted on said basic module and connected to be driven by said first shaft, (c) a portion of a register resetting gear train mounted on said basic module and connected to be driven by said second shaft, (d) register module, including a number of count indicating mechanisms arranged in successive orders, transfer means connecting each lower order to advance the next higher order mechanism, a portion of a count advancing gear train mounted on said register module and connected to advance the count of the lowest order mechanism and means for resetting all of said count indicating mechanisms, including a resetting shaft associated with all of the mechanisms and a portion of a resetting gear train mounted on said register module and connected to drive said resetting shaft, (e) means for removably attaching said register module to said basic module in a predetermined relationship therewith, said portions of said advancing gear trains and said portions of said resetting gear trains being arranged on said basic and register modules respectively, so as to establish driving connection between the portions of the respective trains when said register module is attached to said basic module, to form a complete, operative register advancing train and a complete, operative register resetting train, (f) each count indicating mechanism comprising a drive gear rotatably mounted on said resetting shaft, said drive gear for the lowest order mechanism forming a part of said count advancing gear train and the drive gears of the higher order mechanisms being connected for operation by transfer means corresponding thereto, (g) said register module comprising third and fourth shafts disposed in substantially parallel spaced relation with said resetting shaft and with each other, (h) a belt supporting drum for each mechanism mounted on each of said third and fourth shafts, each drum having a cylindrical, belt supporting surface, a sprocket having teeth extending radially beyond said surface and a gear connected to be driven from said drive gear, (i) a numeral bearing indicator belt for each mechanism, said belt defining a series of openings spaced longitudinally along said belt for driving engagement with said sprocket teeth, (j) each mechanism comprising means for guiding the associated belt in a predetermined path from one drum to the other through a numeral display zone and for supporting at least a portion of said belt, which is of sufficient extent to contain an entire numeral, in a substantially planar condition in said display zone, (k) means including a pawl for each drive gear, for connecting said resetting shaft to rotate the drive gears of said mechanisms, (l) and means for disconnecting said register advancing train from said first shaft while said resetting shaft is operated to reset said indicating mechanisms to zero.

27. A registering mechanism comprising a basic module and a register module mounted thereon, said basic module including a frame, (a) first and second shafts rotatably mounted on said frame, a resetting gear disposed to be driven by said second shaft, (b) a differential mechanism comprising three coacting rotary elements, means connecting one of said elements for operation by said first shaft, a first count advancing gear connected with a second element, (c) said register module including a number of count indicating mechanisms arranged in successive orders, each comprising a count advancing drive gear, transfer means connecting each lower order mechanism to advance the drive gear of the next higher order mechanism, a resetting shaft associated with all of said indicating mechanisms for resetting them to zero, (d) means connecting said first gear to advance the drive gear of the lowest order mechanism, means connecting said resetting gear to drive said resetting shaft, (e) releasable brake means operatively associated with the third rotary element for normally holding said element against rotation to cause said first shaft to actuate said first gear through said first and second rotary elements, (f) means operable by said second shaft for releasing said brake means prior to the operation of said resetting gear, to free said first gear and said second rotary element for operation independently of said first shaft during the operation of said resetting means, (g) said drive gear of each count indicating mechanism being rotatably mounted on said resetting shaft, a pawl for each drive gear, for connecting said resetting shaft to rotate the drive gears of all of said mechanisms, (h) said register module comprising third and fourth shafts disposed in substantially parallel spaced relation with said resetting shaft and with each other, (i) a belt supporting drum for each mechanism mounted on each of said third and fourth shafts, each drum having a cylindrical belt supporting surface, a sprocket having teeth extending radially beyond said surface and a gear connected to be driven from said drive gear, (j) a numeral bearing indicator belt for each mechanism, said belt defining a series of openings spaced longitudinally along said belt for driving engagement with said sprocket teeth, (k) each mechanism comprising means for guiding the associated belt in a predetermined path from one drum to the other, through a numeral display zone, and for supporting at least a portion of said belt, which is of sufficient extent to contain an entire numeral, in a substantially planar condition in said display zone.

References Cited in the file of this patent
UNITED STATES PATENTS

| | | |
|---|---|---|
| 2,074,066 | Wheeler | Mar. 16, 1937 |
| 2,203,109 | Slye | June 4, 1940 |
| 2,206,239 | Rossberg | July 2, 1940 |
| 2,207,284 | Chaplin | July 9, 1940 |
| 2,224,396 | Kennedy et al. | Dec. 10, 1940 |
| 2,274,115 | Wild | Feb. 24, 1942 |
| 2,829,833 | Carbonara | Apr. 8, 1958 |

FOREIGN PATENTS

| | | |
|---|---|---|
| 55,944 | Great Britain | Mar. 16, 1943 |